Aug. 5, 1947.  M. WATTER  2,425,273
APPARATUS FOR TESTING AIRCRAFT
Filed Oct. 27, 1944   2 Sheets-Sheet 1

INVENTOR
Michael Watter.
BY John P. Tarbox
ATTORNEY

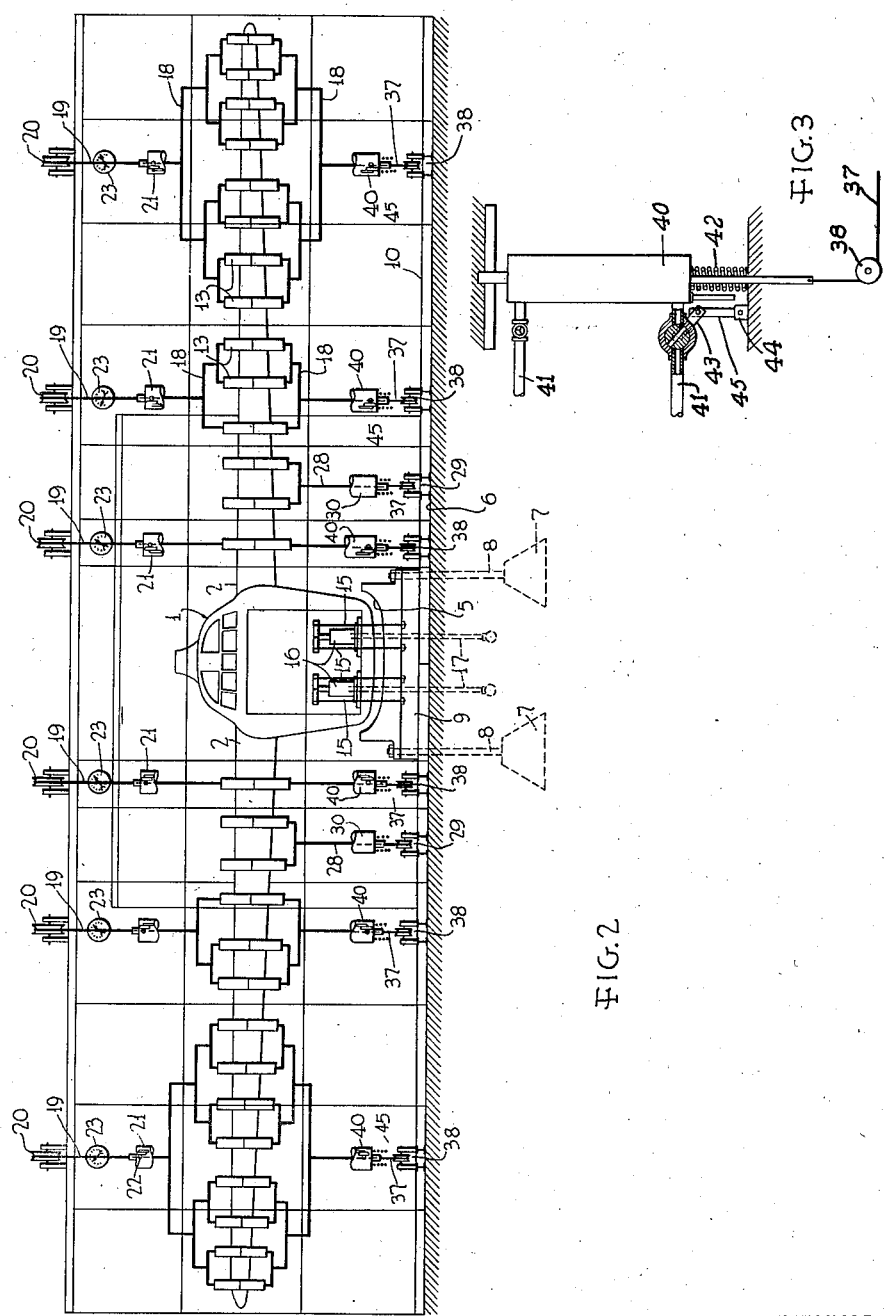

Patented Aug. 5, 1947

2,425,273

UNITED STATES PATENT OFFICE 2,425,273

APPARATUS FOR TESTING AIRCRAFT

Michael Watter, Philadelphia, Pa., assignor to The Budd Company, Philadelphia, Pa., a corporation of Pennsylvania Application October 27, 1944, Serial No. 560,687

6 Claims. (Cl. 73—88)

This invention relates to apparatus for testing structural specimens, particularly airplanes, and has for an object the provision of improvements in this art.

One of the particular objects is to provide testing apparatus wherein the applied loads, though acting through physical connections, are permitted to take such positions as they naturally tend to assume, giving true values and thus avoiding undesired strains on the structure being tested.

Another object is to provide testing apparatus which maintains the parts in a given position upon sudden yielding of a part.

The above and other objects and advantages of the invention will be evident from the following description of an illustrative embodiment, reference being made to the accompanying drawings, wherein:

Figure 2 is a front elevation; and

Figure 3 is an enlarged elevation and section of a detail.

Figure 1:
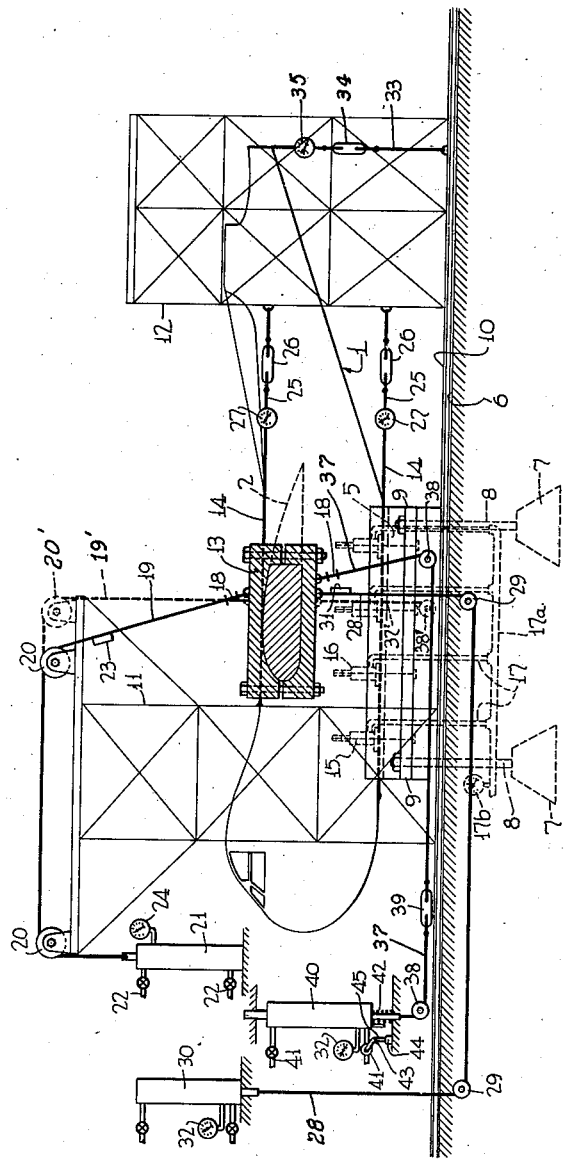
Figure 1 is a side elevation of apparatus for testing an airplane.

The apparatus comprises means for applying loads in many directions, up, down, forward, rearward and to either side. For this purpose, a very substantial base and a surrounding and surmounting superstructure are provided.

The airplane in test comprises a fuselage 1 and wings 2. The same apparatus is adapted to apply loads to a fin and stabilizers, but these parts are not involved in the illustrated test condition, hence are omitted. For most tests of the airplane as a whole, the ailerons, elevators, and rudder are not needed, their loads being applied to their hinge brackets, hence such movable airfoils are omitted here.

A cradle 5 is provided for the fuselage. Heretofore it has been customary to bolt the fuselage rigidly to the cradle or other support, but this did not permit the desired play of forces and often caused damage to the fuselage; hence in the present case the cradle is used only in off-test periods, the airplane being freely floated above the cradle during tests by load and reaction forces applied through flexible means.

The cradle rests on a very firm base 6, which may include sunken anchors 7, and may be held down by tie bolts 8. Blocks 9 and base beams 10 may be interposed between the cradle and the base 6. A forward superstructure 11 and a rear superstructure 12 are mounted near the front and rear, respectively, of the fuselage.

Prior to testing, the wings at rib stations may be provided with form-fitting lined yokes 13 and skin-attached straps 14. When the skin is of a material like stainless steel, the straps 14 may be welded or soldered on.

The fuselage may be held down against an upwardly applied load by a plurality of anchored cables 15 and fluid jacks 16, these elements being adjusted in use to permit the fuselage to float an inch or two above the cradle during actual tests. The fluid pressure is applied through pipes 17 for remote control and registry as from a supervisor's station at the front of the apparatus. A supply manifold 17a and pressure gage 17b are provided for the pipes 17. The jacks might be located near the control station and act through the lower ends of the cables 15, extended, instead of through the upper ends as shown.

Equalizing linkage or whiffletrees 18 are connected to the yokes 13 of the wings on one or both sides, here on both sides. The test load may be applied in various directions, but as illustrated a forward up load on the wings is being applied through cables 19 which are attached to the whiffletrees and which pass upward over sheaves 20 on the superstructure to jacks 21 at the front. Valved pipes 22 control the fluid for the jacks. Dynamometers 23 in the cables measure the applied loads. Fluid pressure gages 24 may be provided for the jacks.

Inasmuch as the test load in the selected test acts at a forward upward angle, the vertical reactions on the fuselage floor through the jacks 16 will not establish equilibrium. To establish such equilibrium, cables 25 are attached to the straps 14 of the wings and cradle and extend rearwardly to turnbuckles 26 secured to the rear frame 12, dynamometers 27 being provided to measure the reaction in the cable.

The motors, mounted forward of the wing on the nacelle, impose a down load on the front of the wings. The motors are absent, but an equivalent load is applied through cables 28 leading over pulleys 29 to jacks 30 at the front. A dynamometer 31 and pressure gage 32 are provided, as usual.

There is also shown a cable 33 and a turnbuckle 34 for applying a reaction on the rear end of the fuselage, a dynamometer 35 being provided to register the load.

All elements essential for one illustrative test, namely an upward and forward wing load, have been described. The illustrated apparatus is adapted for a great number of different tests; and some of the connections for other tests are shown and will be described later. The principal load in the present test is applied through the cables 19 to the wings. Now, should a member or element of the wing suddenly yield, the cables 19 might exert further pull to jeopardize the entire wing structure. This is true because the cables 19 under heavy loads have been elastically stretched several inches; and in spite of the fact that inexpansible hydraulic fluid has been used in the cylinders of the jacks 21, the stretched cables still might cause damage. Besides the desire to prevent injury, it is also desired that the damaged part be maintained in the condition it had when damaged so that the causes of injury may be studied as fully as required.

Accordingly, the present invention provides stop-motion or snubber means for closely following up the parts in the direction of principal loading, though without appreciably opposing this test loading. The means herein illustrated comprises cables 37 attached to the equalizers or whiffletrees 18 below the wings, the cables being matched and aligned with the load applying cables 19 and extending down and forward over sheaves 38 to payout devices of suitable character. Herein there are shown turnbuckles 39 and jacks 40, either usable alone or with the other. If the turnbuckle is used alone, the end of the cable might be secured to a fixed anchorage and an operator will watch the cable to see that it has a small amount of slack at all times. When it begins to become taut, he will turn off on the turnbuckle to make slack in the cable 37.

The jack 40 may be used to a similar purpose but is automatic in its action. Fluid in the lower end of the jack cylinder merely supports the piston, and fluid is bled from the lower valved pipe 41 as required to pay out the cable 37. The upper valved pipe 41 prevents a vacuum above the piston. The cylinder is supported on a sensitive spring 42 which yields when a slight tension comes upon the cable 37. A valve operating arm 43 is connected to a fixed stop 44 in such manner, here by a link 45, as to open the bleed valve when a slight tension comes on the cable. When a sudden, heavy load comes on the cable, the valve will turn past the open position and lock the fluid in the cylinder to maintain the tension in the cable. The specific automatic follow-up mechanism is not a part of the present invention, merely being representative of many types of known devices, mechanical or electrical or both, which might be employed for this use.

In dotted lines in Figure 1, there is shown the disposition of cables 19' and sheaves 38' for applying a vertical load over sheaves 20'. The snubber cables 37' for this arrangement are also shown in dotted lines. This is illustrative of the fact that cables and sheaves may be arranged on the superstructure for test loads in many different directions.

The jacks at the front are shown at different elevations and with symbolic anchorages for convenience of illustration, but it is to be understood that they may all be anchored to the floor for convenient access.

The use of the apparatus will be obvious from the above description. It is thus seen that the invention provides very versatile and useful apparatus for testing a specimen such as an airplane. And while one embodiment has been shown for purposes of illustration, it will be understood that there may be various embodiments within the limits of the prior art and the scope of the subjoined claims.

What is claimed is:

1. Testing apparatus for aircraft comprising in combination, a generally vertical flexible tension element connected to the aircraft and suspending it freely in space, a generally vertical flexible tension element connected to the aircraft at a different lateral point from the suspending element and holding it down against the pull of the suspending element, whereby the aircraft is floated in space so as to be free to move to a certain extent in response to force applied in any lateral direction, means for applying lateral loads on the aircraft, means for applying a load in one direction upon one of said generally vertical tension elements and means for measuring said applied load.

2. Testing apparatus for aircraft comprising in combination, a generally vertical flexible tension element connected to the aircraft and suspending it freely in space, a generally vertical flexible tension element connected to the aircraft and holding it down against the pull of the suspending element, a lateral flexible tension element connected to the aircraft, whereby the aircraft is floated in space so as to be free to move to a certain extent in response to force applied through the lateral tension element, means for applying a load to the aircraft through at least one of said flexible elements, and means for measuring the applied load.

3. Apparatus for testing a yieldable test part, comprising in combination, means connected with the test part for applying a normally slowly moving force which, upon sudden decreased resistance of the test part, would move it rapidly, means holding the test part against said force-applying means but permitting the desired yielding as the test force is applied, and stop means connected to the test part in direct opposition to the force-applying means which exerts substantially no reaction to a slowly moving applied force but which exerts very great reaction to a rapidly moving applied force.

4. Apparatus for testing a yieldable test part, comprising in combination, means connected with the test part for applying a normally slowly moving force which, upon sudden decreased resistance of the test part, would move it rapidly, means holding the test part against said force-applying means but permitting the desired yielding as the test force is applied, and stop means connected to the test part in direct opposition to the force-applying means which exerts substantially no reaction to a slowly moving applied force but which exerts very great reaction to a rapidly moving applied force, and which locks in position against any further movement of the part after the rapid movement and so long as the force-applying means is active.

5. Apparatus for testing a yieldable test part, comprising in combination, means connected with the test part for applying a normally slowly moving force which, upon sudden decreased resistance of the test part, would move it rapidly, means holding the test part against said force-applying means but permitting the desired yielding as the test force is applied, and stop means connected to the test part in direct opposition to the force-applying means which exerts substantially no reaction to a slowly moving applied force but which exerts very great reaction to a rapidly moving applied force, and which locks in position against any further movement of the part after the rapid movement and so long as the force-applying means is active, said stop means including a movable hydraulic device having mounted thereon a slow leak valve for fluid of the device, and means associated with the valve for closing it and halting the slow leak when the hydraulic device moves in response to the rapid movement of the test part.

6. Apparatus for testing an airplane comprising in combination, a cradle supporting the fuselage of the airplane in upright position when not under test, anchorage means, including flexible tie lines and hydraulic devices therefor for holding the fuselage in floating position above the cradle at a distance regulable by said hydraulic devices, flexible loading lines connected to parts of the airplane at a distance from the point of connection of said anchorage means, means to apply and measure test loads in said loading lines, means including a flexible line and load applying and measuring means for applying lateral loads on said airplane, and follow up means including flexible means connected in direct opposition to said loading means for following up the movement of the loading means without opposing resistance thereto during slow movement but to interpose great resistance to and halt sudden movement.

MICHAEL WATTER.

REFERENCES CITED

The following references are of record in the file of this patent:

UNITED STATES PATENTS

| Number | Name | Date |
| --- | --- | --- |
| 2,151,584 | Bugatti | Mar. 21, 1939 |
| 1,546,559 | Batt | July 21, 1925 |
| 1,682,138 | Merrill | Aug. 28, 1928 |
| 2,340,505 | Beed | Feb. 1, 1944 |
| 2,383,491 | Kemmer et al. | Aug. 28, 1945 |

FOREIGN PATENTS

| Number | Country | Date |
| --- | --- | --- |
| 4,158 | Switzerland | Nov. 22, 1891 |